March 21, 1950 P. P. NEWCOMB 2,501,078
AIRCRAFT GAS TURBINE POWER PLANT
Filed March 26, 1946
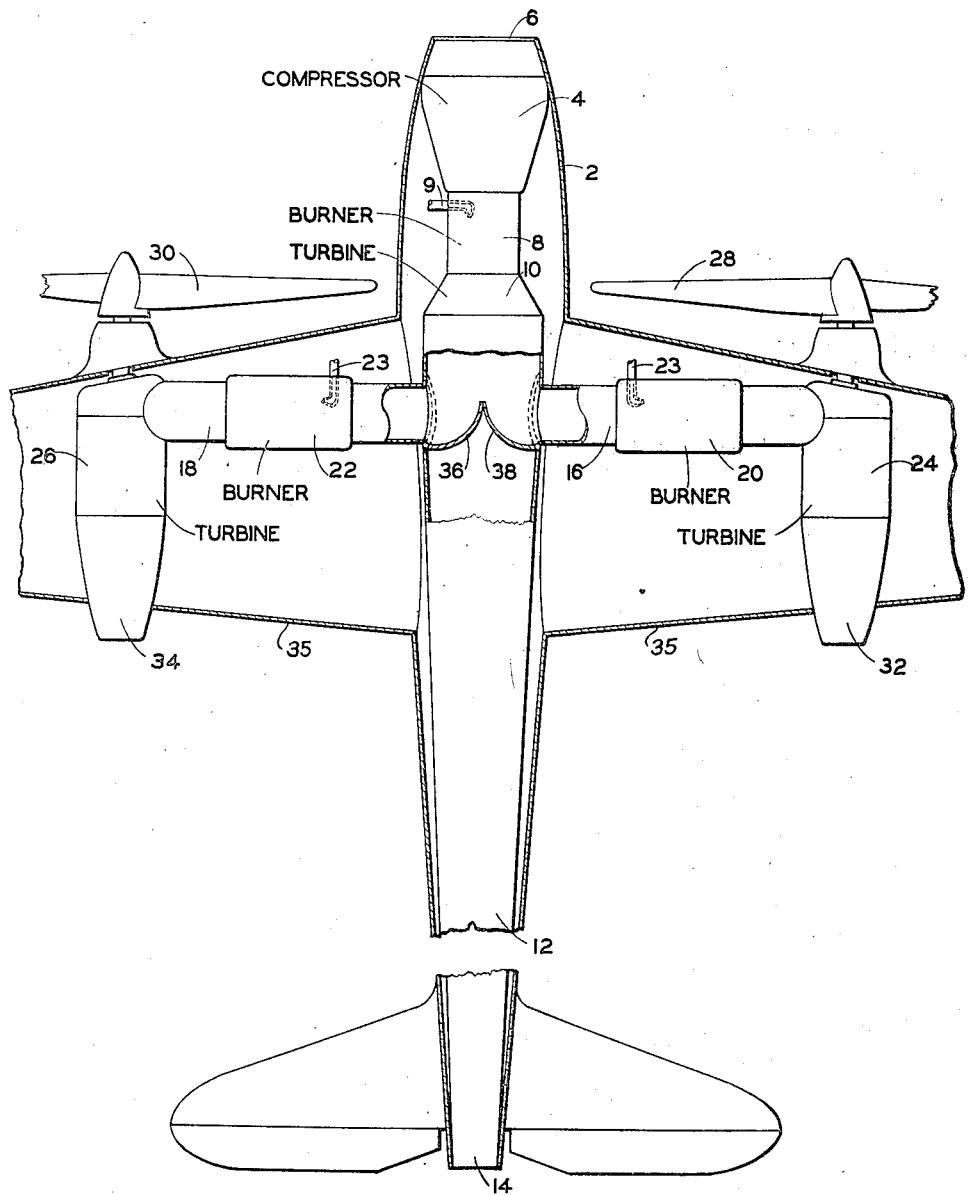
INVENTOR
PHILIP P. NEWCOMB
*Charles A Warren*
ATTORNEY Patented Mar. 21, 1950

2,501,078

UNITED STATES PATENT OFFICE 2,501,078

AIRCRAFT GAS TURBINE POWER PLANT

Philip P. Newcomb, Manchester, Conn., assignor to United Aircraft Corporation, East Hartford, Conn., a corporation of Delaware Application March 26, 1946, Serial No. 657,084

4 Claims. (Cl. 244—15)

This invention relates to a power plant for aircraft.

In the compressor-turbine type of power plant, the turbine drives a compressor which delivers air through a heater, which may be an oil burner, to the turbine. The turbine may be large enough only to drive the compressor, and the gas exhausting from the turbine is then used in a thrust nozzle for propulsion. Alternatively the turbine may be made to develop much more power than is required to drive the compressor, the additional power being used by a propeller. With this construction, if full jet power is desired, the propeller may be disconnected from the turbine but the turbine is then overpowered for the compressor and must operate inefficiently if the compressor operates at the design speed. A feature of this invention is a separate turbine driving the propeller with the compressor-driving turbine developing only the power required to drive the compressor. In this way both turbines may operate at design power.

If a single turbine is used for both compressor and propeller, the power developed is limited by the safe operating temperature of the first stage turbine blades. A feature of the invention is a separate turbine for the propeller in series with the compressor-driving turbine with an arrangement for adding heat to the gas before it enters each turbine. In this way the temperature at the inlet of the first turbine may be lower than with a single burner.

At high speeds, where the propeller loses efficiency, and jet propulsion becomes advantageous, a feature of the invention is the by-passing of the gas around the second turbine and directly to a thrust nozzle.

One feature is an installation in which the compressor-turbine combination is in direct line with the thrust nozzle so that the gas exhausting from the turbine flows rearwardly without change in direction, and thus without loss of energy, to the nozzzle. Another feature of the invention is the location of the propeller driving turbines laterally of the compressor-turbine combination so that the propeller drives will not interfere with the compressor or the thrust nozzle.

Other objects and advantages will be apparent from the specification and claims, and from the accompanying drawings which illustrate an embodiment of the invention.

The figure is a plan view of an installation of the invention.

As shown, the aircraft 2 has mounted in it a compressor 4, the inlet 6 of which faces forwardly so that the inlet pressure of the compressor may be increased by the ram effect. Gas from the compressor passes through a burner or heater 8 in which fuel from a nozzle 9 is mixed with the gas and burned for increasing the heat energy. From the burner, the gas expands through a turbine 10 which is connected with and drives the compressor.

The turbine 10 is designed to develop only the power required for driving the compressor at its design speed and accordingly the turbine utilizes only a small part of the energy in the gas. From the turbine, the power gas is carried directly rearwardly through a duct 12 which terminates in a thrust nozzle 14 directed rearwardly of the aircraft for thrust propulsion.

The above described parts of the power plant are preferably located within the fuselage, the open end of the compressor being located at the forward end of the fuselage and the thrust nozzle being located at the trailing end.

It may be advantageous where maximum power is required, as for take off, to use propellers for increasing the available thrust. To this end, one or more lateral ducts 16 and 18 communicate with the duct 12 and conduct a part or all of the gas from the turbine 10 through oil burners or heaters 20 and 22 having fuel nozzles 23, and through auxiliary turbines 24 and 26. These turbines drive propellers 28 and 30 and each turbine has a thrust nozzle 32 or 34 through which the exhaust gas from the turbines discharges as added propulsive thrust. The thrust nozzles are directed rearwardly as shown.

The duct 12 has mounted therein flap valves 36 and 38 which, in the position shown, direct the gas through the turbines 24 and 26 so that power is delivered to propellers 28 and 30. By moving the flap valves 36 and 38 into the dotted position shown, the ducts 16 and 18 are closed and the gas discharging from the turbine 10 then passes directly through the thrust nozzle 14 for jet propulsion. Obviously with ducts 16 and 18 closed, the propellers 28 and 30 may be feathered to prevent windmilling.

The turbines 24 and 26 are preferably located in the wings 35 and are thus laterally spaced from the main compressor and turbine. By locating these turbines in the wings, the propellers will not affect the flow of air into the compressor, and the thrust nozzles 32 and 34 may be spaced apart enough to avoid damage to the tail surface on the airplane by the hot gas from the nozzles.

With this arrangement, the turbine 10 may be designed to develop only the power required for the compressor 4 and, when the aircraft is propelled entirely by jet thrust, the gas from the turbine 10 goes directly rearwardly without any change in direction and is discharged through the thrust nozzle. The turbines 24 and 26 are then idle. When maximum power is needed, the valves 36 and 38 are placed in the position shown and the turbines 24 and 26 will then drive the propellers to increase the power available, as for take off. By adding the auxiliary oil burners 20 and 22 it becomes unnecessary to supply all of the heat to the gas in the burner 8 making possible a lower inlet temperature for the turbine 10 for more dependable operation. The turbines 24 and 26 can thus be designed to develop the required power for the propellers and can be by-passed when propeller drive is not desired.

It is to be understood that the invention is not limited to the specific embodiment herein illustrated and described, but may be used in other ways without departure from its spirit as defined by the following claims.

I claim:

1. A power plant including a compressor, a turbine driving it, a combustion chamber having means for introducing fuel thereto, and means for conducting gas from the compressor through the chamber and into the turbine, in combination with a thrust nozzle substantially in alignment with the turbine and through which the gas from the turbine is discharged without change in direction, a pair of turbines located on opposite sides of the compressor and first turbine, a propeller connected to each of the turbines of said pair of turbines, a conduit from the discharge end of the first turbine to each of said pair of turbines, and valve means for directing gas from the first turbine through the nozzle or through the pair of turbines selectively.

2. A power plant including a compressor, a turbine driving it, a combustion chamber having means for introducing fuel thereto, and means for conducting gas from the compressor through the chamber and into the turbine, in combination with a thrust nozzle substantially in alignment with the turbine and through which the gas from the turbine is discharged without change in direction, a pair of turbines located on opposite sides of the compressor and first turbine, a propeller connected to each of the turbines of said pair of turbines, a conduit from the discharge end of the first turbine to each of said pair of turbines, and means in each of said conduits for adding heat to the gas between the first turbine and the pair of turbines.

3. A power plant installation for an airplane having a fuselage and wings, a compressor, a turbine driving it, a combustion chamber having means for introducing fuel thereto, and means for conducting gas from the compressor through the combustion chamber into the turbine, said parts all being located in the fuselage with the turbine arranged to exhaust rearwardly, a thrust nozzle also located in the fuselage rearwardly of the turbine and through which gas from the turbine is discharged without substantial change in direction, additional turbines mounted in the wings laterally of the first compressor and turbine, a propeller for each of said additional turbines, a conduit from the discharge end of the first turbine to each of said pair of turbines, and means for directing gas from the first turbine through the nozzle or through the additional turbines selectively.

4. A power plant installation for an airplane having a fuselage and wings, a compressor, a turbine driving it, a combustion chamber having means for introducing fuel thereto, and means for conducting gas from the compressor through the combustion chamber into the turbine, said parts all being located in the fuselage with the turbine arranged to exhaust rearwardly, a thrust nozzle also located in the fuselage rearwardly of the turbine and through which gas from the turbine is discharged without substantial change in direction, additional turbines mounted in the wings laterally of the first compressor and turbine, a propeller for each of said additional turbines, additional thrust nozzles located rearwardly of said additional turbines and connected with said additional turbines and through which gas from said additional turbines discharges and means for selectively directing gas from the first turbine through said additional turbines or through said first thrust nozzle.

PHILIP P. NEWCOMB.

REFERENCES CITED

The following references are of record in the file of this patent:

UNITED STATES PATENTS

| Number | Name | Date |
|---|---|---|
| 2,050,349 | Lysholm | Aug. 11, 1936 |
| 2,409,177 | Allen | Oct. 15, 1946 |
| 2,411,227 | Planiol | Nov. 19, 1946 |

FOREIGN PATENTS

| Number | Country | Date |
|---|---|---|
| 409,498 | Great Britain | May 3, 1934 |
| 870,648 | France | Dec. 22, 1941 |
| 877,590 | France | Sept. 7, 1942 |